(12) United States Patent
Matsumura et al.

(10) Patent No.: US 12,160,297 B2
(45) Date of Patent: Dec. 3, 2024

(54) TERMINAL AND RADIO COMMUNICATION METHOD

(71) Applicant: NTT DOCOMO, INC., Tokyo (JP)

(72) Inventors: Yuki Matsumura, Tokyo (JP); Shohei Yoshioka, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 314 days.

(21) Appl. No.: 17/617,829

(22) PCT Filed: Jun. 10, 2019

(86) PCT No.: PCT/JP2019/023000
§ 371 (c)(1),
(2) Date: Dec. 9, 2021

(87) PCT Pub. No.: WO2020/250290
PCT Pub. Date: Dec. 17, 2020

(65) Prior Publication Data
US 2022/0271812 A1    Aug. 25, 2022

(51) Int. Cl.
*H04B 7/06* (2006.01)
*H04L 1/16* (2023.01)
*H04L 1/1607* (2023.01)
*H04W 72/04* (2023.01)
*H04W 72/21* (2023.01)

(52) U.S. Cl.
CPC ......... *H04B 7/0626* (2013.01); *H04L 1/1614* (2013.01); *H04W 72/21* (2023.01)

(58) Field of Classification Search
CPC .. H04B 7/0226; H04B 7/0658; H04B 7/0478; H04L 1/1614; H04W 72/21; H04W 28/06

USPC ................................................... 370/329–330
See application file for complete search history.

(56) References Cited

U.S. PATENT DOCUMENTS

| | | | | |
|---|---|---|---|---|
| 2019/0109626 | A1* | 4/2019 | Park | H04B 7/0658 |
| 2020/0235790 | A1* | 7/2020 | Rahman | H04L 5/0051 |
| 2021/0376887 | A1* | 12/2021 | Wu | H04B 7/0626 |
| 2022/0052734 | A1* | 2/2022 | Faxer | H04B 7/0645 |

(Continued)

OTHER PUBLICATIONS

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

(Continued)

*Primary Examiner* — Candal Elpenord
(74) *Attorney, Agent, or Firm* — Osha Bergman Watanabe & Burton LLP

(57) ABSTRACT

A terminal of the present disclosure includes a transmitting section that transmits channel state information including a first part and a second part, the first part including determination information for determining a size of the second part, and a control section that supposes the size of the second part or the determination information to be a certain value to determine a physical uplink control channel resource to be used in transmission of the channel state information, based on the certain value. This structure enables a base station to appropriately perform reception processing of UCI (for example, UCI including first and second parts of CSI).

3 Claims, 11 Drawing Sheets

(56) References Cited

U.S. PATENT DOCUMENTS

2022/0200667 A1* 6/2022 Hajri .................... H04B 7/0417
2022/0224391 A1* 7/2022 Ramireddy .......... H04B 7/0663

OTHER PUBLICATIONS

International Search Report for corresponding International Application No. PCT/JP2019/023000, mailed Dec. 24, 2019 (3 pages).
Written Opinion for corresponding International Application No. PCT/JP2019/023000, mailed Dec. 24, 2019 (3 pages).
Sharp; "Remaining issues on PUCCH"; 3GPP TSG RAN WG1#94bis Meeting, R1-1811143; Chengdu, China; Oct. 8-12, 2018 (9 pages).
Huawei et al.; "Discussion on CSI enhancement"; 3GPP TSG RAN WG1 Meeting #97, R1-1906028; Reno, USA; May 13-17, 2019 (18 pages).
ZTE; "CSI Enhancement for MU-MIMO Support"; 3GPP TSG RAN WG1 Meeting #96, R1-1901633; Athens, Greece; Feb. 25-Mar. 1, 2019 (15 pages).
Office Action issued in Japanese Application No. 2021-525431 dated Mar. 28, 2023 (4 pages).
Office Action issued in Japanese Application No. 2021-525431 dated Aug. 8, 2023 (4 pages).
Qualcomm Incorporated; "CSI Enhancement for MU-MIMO Support" 3GPP TSG RAN WG1 Meeting #97, R1-1907288; Reno, U.S.A.; May 13-17, 2019 (15 pages).

* cited by examiner

PHASE COMPENSATION

FIG. 4A

| Bit group | Codeword |
|---|---|
| 0000 | 01 |
| 0001 | 000 |
| 0010 | 100 |
| 0100 | 010 |
| 1000 | 110 |
| 0011 | 00011 |
| 0101 | 10011 |
| 0110 | 01011 |
| 1001 | 11011 |
| 1010 | 00111 |
| 1100 | 10111 |
| 0111 | 001111 |
| 1011 | 101111 |
| 1101 | 011111 |
| 1110 | 0111111 |
| 1111 | 1111111 |

$$\begin{aligned}\text{EXPECTATION VALUE OF CODEWORD} &= \sum p_i\, CW_i \\ &= \tfrac{81}{256} \times 2 + \tfrac{27}{256} \times 4 \times 3 + \tfrac{9}{256} \times 6 \times 5 \\ &\quad + \tfrac{3}{256} \times 3 \times 6 + \tfrac{3}{256} \times 7 + \\ &\quad \tfrac{1}{256} \times 7 \\ &= 3.27 \text{ bits}\end{aligned}$$

FIG. 4B

UNCOMPRESSED BITMAP 0000 0100 0001 0000 0001 0000 0010 0001 0000 1000

BITMAP COMPRESSED BY TERMINAL (26 BITS)

01  010  000  01  000  01  100  000  01  110

BITMAP DECODED BY BASE STATION 01  010  000  01  000  01  100  000  01  110
0000 0100 0001 0000 0001 0000 0010 0001 0000 1000

$$L = 4, B_{\text{Tot}} = 112, 2K_0 = 28 \text{ and } v = 4$$

| 0 | 1 | 0 | 0 | 0 | 0 |
|---|---|---|---|---|---|
| 1 | 0 | 1 | 0 | 0 | 0 |
| 1 | 0 | 0 | 0 | 0 | 0 |
| 1 | 0 | 0 | 0 | 0 | 0 |
| 0 | 0 | 0 | 1 | 1 | 0 |
| 0 | 0 | 0 | 0 | 0 | 0 |
| 0 | 0 | 0 | 0 | 1 | 0 |
| 0 | 0 | 0 | 0 | 0 | 0 |

4-bit group $$P\{y=1\} = \frac{28}{112} = 0.25$$

$$P\{y=0\} = \frac{84}{112} = 0.75$$

Number of bits/group = 4 (16 different messages)

Entropy, $H(X) = \sum p_i \log 1/p_i$ $$= \frac{81}{256}\log\frac{256}{81} + 4 \times \frac{27}{256}\log\frac{256}{27} + 6 \times \frac{9}{256}\log\frac{256}{9}$$

$$+ 4 \times \frac{3}{256}\log\frac{256}{3} + \frac{1}{256}\log\frac{256}{1}$$

$$= 3.24 \text{ bits}$$

TERMINAL AND RADIO COMMUNICATION METHOD

TECHNICAL FIELD

The present disclosure relates to a terminal and a radio communication method in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel. 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (hereinafter also referred to as "NR"), a study is underway to enable a terminal (also referred to as a "user terminal," a "user equipment (UE)," and so on) to report channel state information (CSI) including a plurality of parts (for example, a first part and a second part) that are separately coded, such coding being also referred to as "separate coding" and so on.

Specifically, for NR, determining the size of a second part of CSI depending on information in a first part of the CSI has been under study. For example, including information for determining the size of the second part of the CSI in the first part of the CSI is under study.

However, in a case where the size of the second part depends on the information in the first part, a base station is unable to recognize the size of the second part until decoding the first part. As a result, the base station may not appropriately perform reception processing (such as reception, demodulation, or decoding) of uplink control information (UCI) including the first and second parts of the CSI.

Thus, an object of the present disclosure is to provide a terminal and a radio communication method that enable a base station to appropriately perform reception processing of UCI (for example, UCI including first and second parts of CSI).

Solution to Problem

A terminal according to one aspect of the present disclosure includes a transmitting section that transmits channel state information including a first part and a second part, the first part including determination information for determining a size of the second part, and a control section that supposes the size of the second part or the determination information to be a certain value to determine a physical uplink control channel resource to be used in transmission of the channel state information, based on the certain value.

Advantageous Effects of Invention

According to one aspect of the present disclosure, a base station can appropriately perform reception processing of UCI (for example, UCI including first and second parts of CSI).

BRIEF DESCRIPTION OF DRAWINGS

FIGS. 4A and 4B are diagrams to show an example of coding using Huffman code;

DESCRIPTION OF EMBODIMENTS (PUCCH Resource)

For future radio communication systems (for example, NR), a study is underway to support a plurality of formats (PUCCH formats (PFs)) for physical uplink control channel (such as physical uplink control channel (PUCCH)) used in transmission of UCI. The plurality of PFs may be different from one another in at least one of the number of UCI bits to be transmitted and a transmission period (number of symbols).

For example, NR Rel. 15 supports five kinds of PFs, such as PFs 0 to 5. Note that the names of PFs described below are merely examples, and other names may also be used.

For example, PFs 0 and 1 are PFs used in transmission of UCI of up to 2 bits. The UCI may be at least one of, for example, transmission confirmation information (Hybrid Automatic Repeat reQuest Acknowledge (HARQ-ACK), ACK or NACK, A/N, and so on) and scheduling request (SR) (HARQ-ACK/SR).

PF 0 is transmitted in 1 or 2 symbols and is thus also referred to as a "short PUCCH," a "sequence-based short PUCCH," and so on. On the other hand, PF 1 is transmitted in 4 symbols or more and is thus also referred to as a "long PUCCH" and so on.

PFs 2 to 4 are PFs used in transmission of UCI of more than 2 bits. The UCI may be at least one of, for example, channel state information (CSI), HARQ-ACK, and SR.

PF 2 is transmitted in 1 or 2 symbols and is thus also referred to as a "short PUCCH" and so on. On the other hand, PFs 3 and 4 are transmitted in 4 symbols or more and is thus also referred to as "long PUCCHs" and so on. The PUCCH resource of PF 3 may not include an orthogonal cover code (OCC). The PUCCH resource of a PF may include an OCC.

The resource for PUCCH (PUCCH resource) of a PF as described above may be determined based on, for example, the number of bits (also referred to as "payload," "payload size," and so on) of UCI in the following cases.

Case 1: multiplexing of CSI and HARQ-ACK
Case 2: determination of the PRB size of PF 2 or 3
Case 3: CSI in "multiple CSI reports"

<Case 1>

Figure 1:
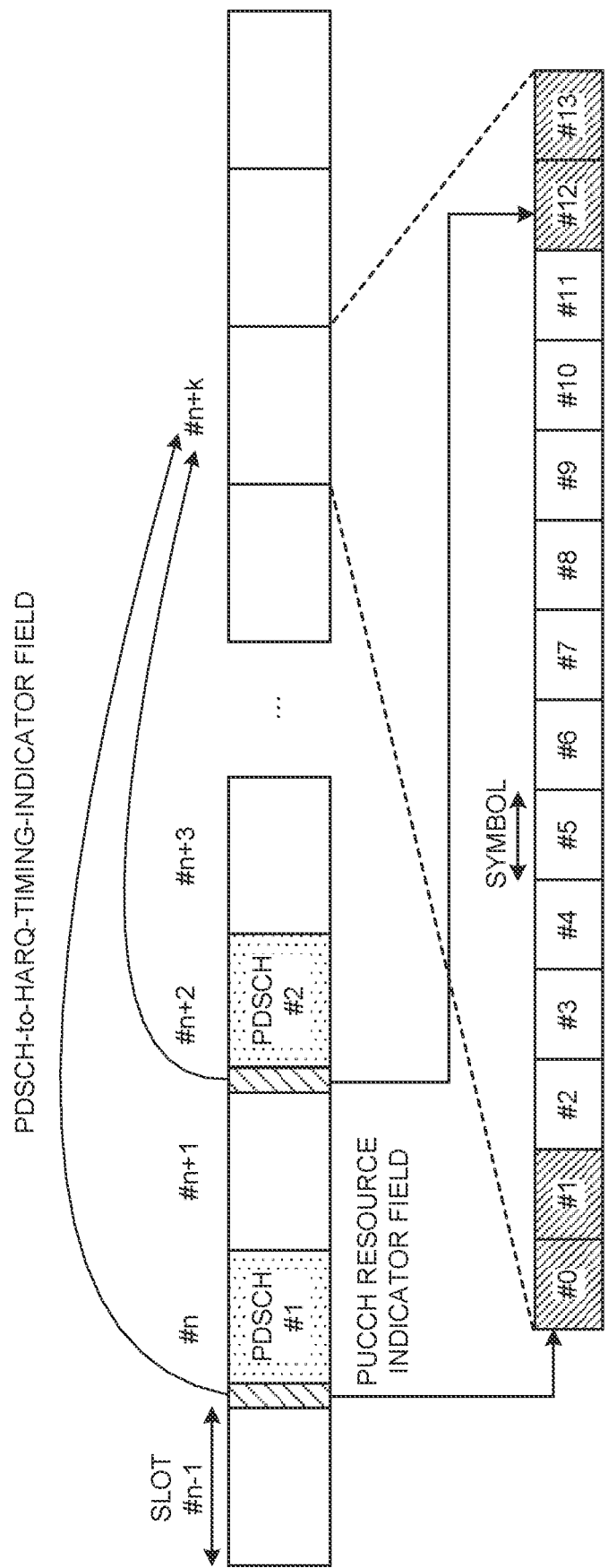
FIG. 1 is a diagram to show an example of determination of transmission timing of PUCCHs.

FIG. 1 is a diagram to show an example of determination of transmission timing of PUCCHs. For example, in FIG. 1, a UE may determine slot #n+k that is used for feeding back HARQ-ACK with respect to each of PDSCHs (for example, PDSCHs #1 and #2), based on a value of a certain field (for example, PDSCH-to-HARQ-timing-indicator field) in downlink control information (DCI) used for scheduling each of the PDSCHs (for example, PDSCHs #1 and #2).

The UE may also determine a PUCCH resource to be used for feeding back HARQ-ACK with respect to each of PDSCHs in a certain period, based on a value of a certain field (for example, PUCCH resource indicator field) in a last DCI (for example, in FIG. 1, DCI for scheduling PDSCH #2) in a certain period (for example, HARQ-ACK window, window).

Figure 2:
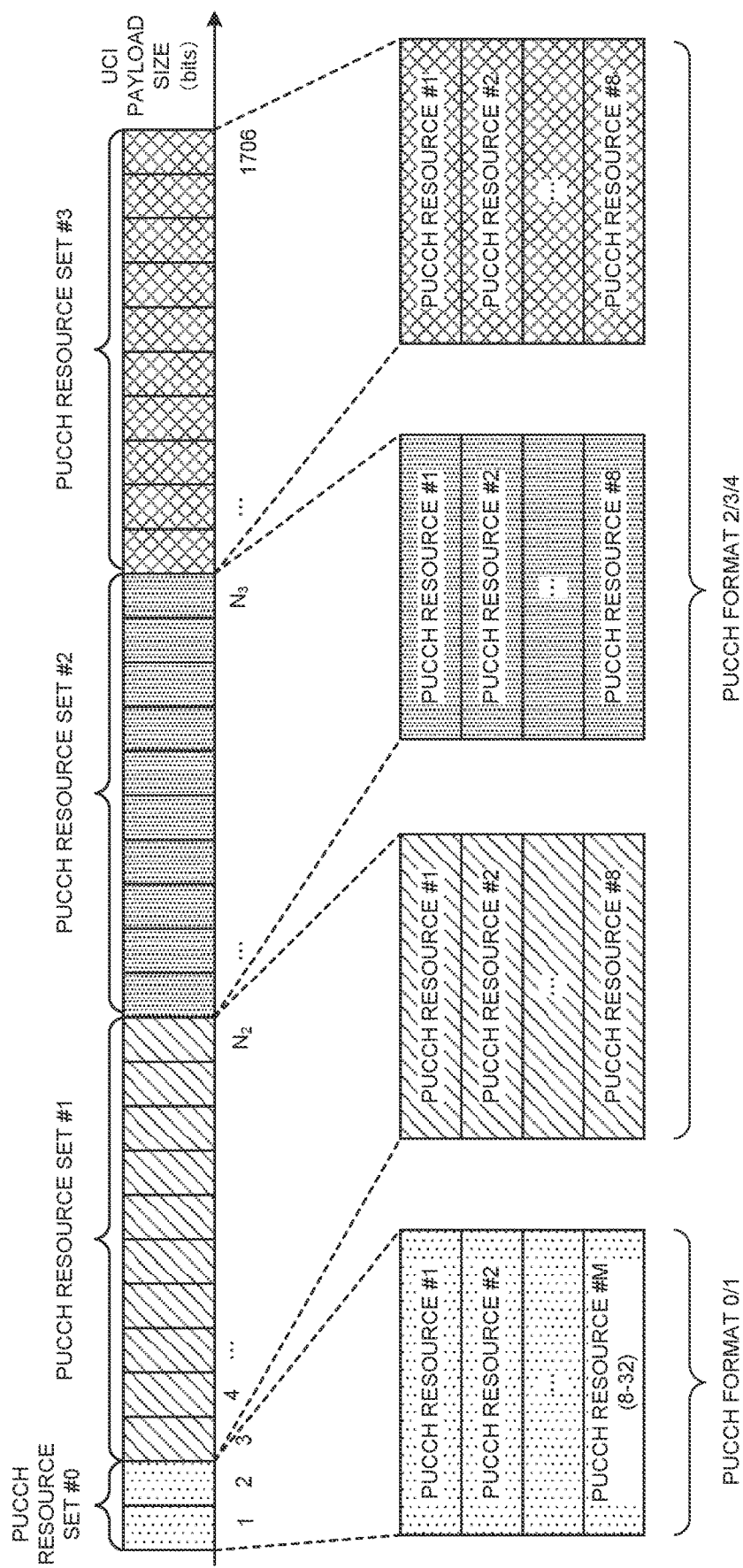
FIG. 2 is a diagram to show an example of determination of PUCCH resources.

FIG. 2 is a diagram to show an example of determination of PUCCH resources. The UE may receive information (PUCCH resource information, such as a "PUCCH-Resource" of an RRC IE) relating to one or more PUCCH resources by higher layer signaling.

Note that, in the present disclosure, the higher layer signaling may be at least one of, for example, radio resource control (RRC) signaling, system information (for example, at least one of remaining minimum system information (RMSI), other system information (OSI), master information block (MIB), and system information block (SIB)), and broadcast information (physical broadcast channel (PBCH)).

The UE may receive information (PUCCH resource set information, such as a "PUCCH-ResourceSet" of an RRC IE) relating to a set (PUCCH resource set) including one or more PUCCH resources. The PUCCH resource set information may include information indicating one or more PUCCH resources in a PUCCH resource set. For example, in FIG. 2, the UE may receive PUCCH resource set information of four PUCCH resource sets #0 to #3, and a certain amount of PUCCH resource information contained in each of PUCCH resource sets #0 to #3.

Each of the PUCCH resource sets may be associated with one or more PUCCH resources. Note that the phrase "associated with" may be rephrased with "included" or "include." For example, in FIG. 2, PUCCH resource set #0 may be associated with (or may include) M (for example, 8≤M≤32) number of PUCCH resources. Each of PUCCH resource sets #1 to #3 may be associated with eight PUCCH resources.

Each of the PUCCH resource sets may be associated with PUCCH resources of a certain PF. For example, PUCCH resource set #0 may be associated with PUCCH resources of PF 0 or 1. PUCCH resource sets #1, #2, and #3 may be associated with PUCCH resources of PFs 2, 3, and 4, respectively.

As shown in FIG. 2, the UE may select the PUCCH resource set, based on the payload size (number of bits) of UCI. For example, in FIG. 2, the UE may select PUCCH resource set #0 for UCI of up to 2 bits, PUCCH resource set #1 for UCI in a first range (for example, 3 or more and $N_2$ or less), PUCCH resource set #2 for UCI in a second range (for example, more than $N_2$ and $N_3$ or less), and PUCCH resource set #3 for UCI in a third range (for example, more than $N_3$ and 1706 or less). Note that the numbers $N_2$ and $N_3$ may be configured to the UE by higher layer signaling.

The UE may determine a PUCCH resource to be used in transmission of UCI, from among selected PUCCH resource sets, based on at least one of a value of a certain field (such as a PUCCH resource indicator field) in DCI and an index of a resource (such as a control channel element (CCE)) that is allocated in the DCI.

Note that each of the PUCCH resources in FIG. 2 may include a value of at least one of the following parameters (also referred to as "fields," "information," and so on). Note that, a range of possible values with respect to each PUCCH format may be determined in each of the parameters.

Symbol (start symbol) at which allocation of a PUCCH starts

Number of symbols allocated to a PUCCH in a slot (period allocated to a PUCCH)

PRB index at which allocation of a PUCCH starts

Number of PRBs allocated to a PUCCH

Whether frequency hopping is enabled for a PUCCH

Frequency resource of second hop in a case where the frequency hopping is enabled, and index of initial cyclic shift (CS)

Index of an orthogonal spread code (for example, orthogonal cover code (OCC)) in a time-domain, and length of OCC (also referred to as "OCC length," "spreading rate," and so on) used in block-wise spreading before discrete Fourier transform (DFT)

Index of an OCC used in block-wise spreading after DFT

<Case 2>

In a case where UCI is transmitted by using PF 2 or 3 of a PUCCH resource including one or more PRBs, the UE may determine a number $M^{PUCCH}_{RB, min}$ of the PRBs, based on the number of bits of the UCI. The number $M^{PUCCH}_{RB, min}$ of the PRBs may be the number of PRBs or less that is provided by a higher layer parameter (such as nofPRBs), for the PUCCH resource of PF 2 or 3. For example, the number of the PRBs may be determined based on a desired coding rate (target coding rate) of UCI.

Note that, in a case of transmitting the UCI on a physical uplink shared channel (such as a physical uplink shared channel (PUSCH)), the UE may determine the number of PRBs of the PUSCH used in transmission of the UCI.

<Case 3>

Transmission (for example, dropping or omission of at least one or more of a plurality of pieces of CSI, and determination of a PUCCH resource) of the plurality of CSI reports may be controlled based on the number of bits of UCI. The control of transmission of the plurality of CSI reports may be performed based on a desired coding rate.

As described above, resources (for example, PUCCH resources, number of PRBs of a PUSCH, and dropping or omission of at least one or more pieces of CSI) used in transmission of UCI may be controlled based on the number of bits of the UCI.

(CSI Codebook)

In NR, the UE may feed back (report, transmit) CSI that is generated by using a reference signal (or a resource for the reference signal) to a base station. The UE may transmit the CSI on a PUCCH or a PUSCH.

The reference signal for generating CSI may be at least one of, for example, a channel state information reference signal (CSI-RS), a synchronization signal/broadcast channel (synchronization signal/physical broadcast channel (SS/PBCH)) block, a synchronization signal (SS), and a demodulation reference signal (DMRS).

The CSI-RS may include at least one of non zero power (NZP) CSI-RS and CSI-interference management (CSI-IM). The SS/PBCH block is a block including a synchronization signal (such as a primary synchronization signal (PSS) or a secondary synchronization signal (SSS)) and a PBCH (and corresponding DMRS), and the SS/PBCH block may be referred to as an "SS block (SSB)" and so on.

Note that CSI may include at least one of a channel quality indicator (CQI), a precoding matrix indicator (PMI), a CSI-RS resource indicator (CRI), an SS/PBCH block resource indicator (SS/PBCH block indicator (SSBRI)), a layer indicator (LI), a rank indicator (RI), L1-RSRP (Layer 1 Reference Signal Received Power), L1-RSRQ (Reference Signal Received Quality), an L1-SINR (Signal to Interference plus Noise Ratio), and an L1-SNR (Signal to Noise Ratio).

The UE may receive information relating to CSI feedback (also referred to as "CSI reporting" and so on) (CSI report configuration information, such as "CSI-ReportConfig" of an RRC IE). The CSI report configuration information may include, for example, information relating to period, offset, report type, and the like.

In NR, a plurality of types of CSI may be provided. The plurality of the types of CSI may be different from one another in at least one of, for example, application, structure, and size of codebook. For example, a first type (Type 1 CSI, Type I CSI) may be used in selection of a single beam. A second type (Type 2 CSI, Type II CSI) may be used in selection of multiple beams. The single beam may be replaced with a "single layer," whereas the multiple beams may be rephrased with a "plurality of beams."

Figure 3A:
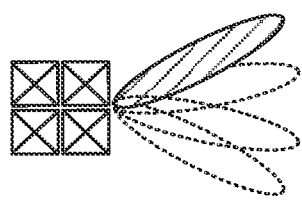
FIGS. 3A to 3C are diagrams to show examples of PMI reporting for Type 1 CSI and Type 2 CSI.
Figure 3B:
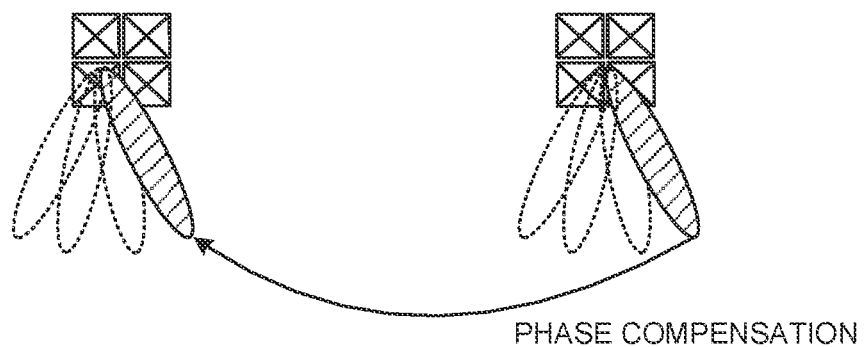
Figure 3C:
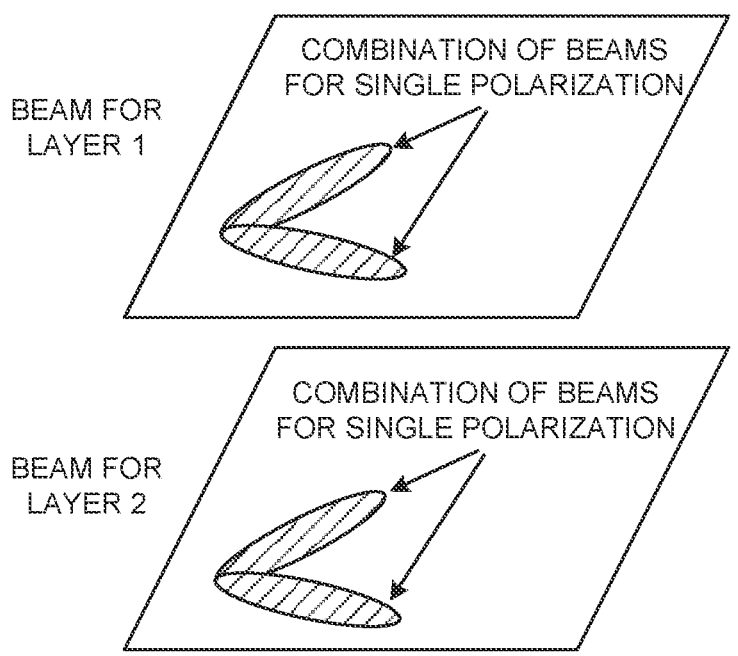

FIGS. 3A to 3C are diagrams to show examples of PMI reporting for Type 1 CSI and Type 2 CSI. Type 1 CSI may include a plurality of subtypes. For example, the Type 1 CSI may include Type 1 single-panel CSI for selecting a single beam in a single panel, as shown in FIG. 3A, and include Type 2 single-panel CSI for selecting a single beam in a plurality of panels (multi-panel), as shown in FIG. 3B.

As shown in FIG. 3A, Type 1 single-panel CSI may be designed for a single antenna panel with $N_1 \times N_2$ cross-polarized antenna elements. Note that, although $(N_1, N_2)=(2, 2)$ in FIG. 3A, the structure of the single antenna panel is not limited to that in the drawing.

In a codebook for Type 1 single-panel CSI (also referred to as "Type 1 single-panel codebook" and so on), an index (codebook index) and precoding matrix (also referred to as "precoder matrix" and so on) per layer may be associated with each other. Type 1 single-panel CSI may include the index as a value of PMI.

The codebook for Type 1 single-panel CSI may support transmission in ranks 1 to 8 using one beam in each layer. In a case of the rank larger than 1, inter-layer orthogonality may be achieved by a co-phase and orthogonal beam. For Type 1 single-panel CSI, a selected single beam may be expressed by Equation 1. Here, "$b_l$" may be a discrete Fourier transform (DFT) vector of a beam l.

[Math. 1]

$$\hat{h} = b_l \qquad \text{(Equation 1)}$$

As shown in FIG. 3B, Type 1 multi-panel CSI may be assumed to be two or four two-dimensional panels, each of which may include $N_1 \times N_2$ cross-polarized antenna elements. Note that, although $(N_1, N_2)=(2, 2)$ in FIG. 3B, the structure of the single antenna panel is not limited to that in the drawing.

In a codebook for Type 1 multi-panel CSI (also referred to as "Type 1 multi-panel codebook" and so on), an index (codebook index) and precoding matrix of each layer may be associated with each other. Type 1 multi-panel CSI may include the index as a value of PMI.

The codebook for Type 1 multi-panel CSI may support transmission in ranks 1 to 4. Phase compensation between panels is required. For Type 1 multi-panel CSI, a selected single beam may be expressed by Equation 1.

As shown in FIG. 3C, Type 2 CSI may provide channel information with spatial granularity higher than that of Type 1 CSI. Type 2 CSI may select and report up to four orthogonal beams. For each of selected beams and each of two polarizations, a reported PMI may provide an amplitude value (partially wideband and partially subband) and a phase value (subband).

The codebook for Type 2 CSI may support transmission in ranks 1 and 2. Combinations of two to four beams may be supported. FIG. 3C shows a combination of beams for a polarization per layer. For Type 2 CSI, a plurality of selected beams may be expressed by Equation 2. Here, "L" may be a total number of beams, "$a_l$" may be amplitude of a beam l, "$\varphi_l$" may be a phase of the beam l, and "$b_l$" may be a DFT vector of the beam l.

[Math. 2]

$$\hat{h} = \sum_{l=1}^{L} a_l e^{-i\varphi_l} b_l \qquad \text{(Equation 2)}$$

The UE and the base station may use Type 1 CSI in order to maintain coarse link using a single beam. The UE and the base station may use Type 2 CSI in order to establish a connection using multiple beams (for example, a plurality of layers). For example, Type 2 CSI may include information of each layer (or beam-associated information, such as a beam number).

The control may be performed in such a manner that only one or more CSI parameters of information type (CSI parameters) of Type 2 CSI are reported. The CSI including one or more items of information types may be referred to as "partial Type 2 CSI."

In a case of transmitting Type 1 CSI, the UE may report, for example, an RI and/or a CRI, a PMI, and a CQI, as CSI parameters. Note that the PMI may include wideband and long feedback term PMI 1, and subband and short feedback term PMI 2. Note that PMI 1 may be used in selection of a vector W1 whereas PMI 2 may be used in selection of a vector W2, and a precoder W may be determined based on W1 and W2 (W=W1*W2).

In a case of transmitting Type 2 CSI, the UE may report, for example, an RI, a CQI, and numbers of non-zero wideband amplitude coefficients per layer (number of non-zero wideband amplitude coefficients per layer), as CSI parameters. The number of non zero wideband amplitude coefficients corresponds to a beam number of a beam in which amplitude is not scaled to zero. In this case, it is not necessary to transmit information of a beam in which amplitude is zero (or is a certain threshold or less, or less than the certain threshold that can be considered to be substantially zero). Thus, transmitting the number of non-zero wideband amplitude coefficients enables reduction in overhead for a PMI.

In Type 2 CSI feedback, Part 1 CSI may include an RI, a CQI, and the numbers of non-zero wideband amplitude coefficients per layer. Part 2 CSI may include a PMI.

Type 2 CSI feedback can cause large overhead. Thus, in Type 2 CSI feedback, higher supported rank and larger number of combinations of beams increase overhead.

Type 2 CSI may include at least one of, for example, one wideband (all subbands) CSI and subband CSI per subband. The wideband CSI may include at least one of, for example, a rotation factor, selection of L number of beams, a maximum value of 2L number of beam combining coefficients per layer, and a wideband amplitude per layer. The subband CSI for each subband may include at least one of, for example, a subband amplitude and a subband phase.

In this manner, overhead for Type 2 CSI mostly depends on the subband phase and the subband amplitude per subband. The overhead (payload size) of the phase and the overhead (payload size) of the amplitude differ from each other.

In order to reduce CSI overhead, the UE may perform partial subband CSI reporting in which CSI reporting for a part of a plurality of subbands is performed.

CSI reporting type may include (1) periodic CSI (P-CSI) reporting, (2) aperiodic CSI (A-CSI) reporting, and (3) semi-persistent CSI reporting (SP-CSI) reporting.

The CSI granularity may be periodic, semi-persistent, or aperiodic, in time domain, may be wideband (WB) CSI or subband (SB) CSI in frequency domain, and may be Type 1 CSI or Type 2 CSI in spatial domain.

CSI may include a plurality of parts. For example, CSI may include a first part (also referred to as "CSI Part 1," "CSI Part I," and so on) and a second part (also referred to as "CSI Part 2," "CSI Part II," and so on). CSI Part 1 and CSI Part 2 may be separately coded (which is also referred to as "separate coding" and so on).

For example, CSI Part 1 may include at least one of an RI, a CRI, a CQI, and the number of non-zero coefficients (NZCs) (number of NZCs (NNZC)). CSI Part 2 may include at least one of a PMI and an NZC.

The NZC may be information indicating at least one of, for example, DFT vector, amplitude, and phase and may have a value other than zero. The amplitude may be wideband amplitude or subband amplitude.

In Type 2 CSI in Rel. 15, a precoding vector for $N_3$ PMI subband may be expressed by, for example, following Equation (3) in the condition where RI=v and a layer l is 1 to v.

[Math. 3]

$$W_l(N_t \times N_3) = W_{1,l} W_{coeff,l} \quad \text{(Equation 3)}$$

Here, "$W_{1,l}$ (Nt×2L)" may represent a matrix constituting an L space domain (SD) two-dimensional DFT (SD 2D-DFT) of the layer l. The symbol "l" may represent a beam number, and "$N_t$" may represent the number of ports. The subset based on SD 2D-DFT may be provided by $\{b_{l,1}, \ldots, b_{l,L}\}$. Here, "$b_{l,i}$ ($1 \leq i \leq L$)" may represent an i-th 2D DFT vector corresponding to an l-th layer.

"$W_{Coeff,l}$ (2L×$N_3$)" may represent a subband complex combination coefficient matrix (SB complex combination coefficient matrix) of the layer l.

Such CSI Part 2 may increase overhead. For this reason, methods for reducing the size of CSI Part 2 are under study.
<FD Compression>

For example, in consideration of frequency domain (FD) compression, information in $W_{Coeff,l}$ can be compressed. This compression is assumed to reduce overhead for Type 2 CSI.

In Type 2 CSI in Rel. 16, a precoding vector of an $N_{SB}$ subband layer l in consideration of FD compression may be expressed by, for example, following Equation (4) in the condition where RI=v and a layer l is 1 to v.

[Math. 4]

$$W_l(N_t \times N_{SB}) = \overline{\overline{W_{1,l} \tilde{W}_l W_{freq,l}^H}}^{\approx W_{coeff,l}} \quad \text{(Equation 4)}$$

Here, "$W_{freq,l}$ ($N_3 \times M_l$)" may represent a matrix constituting an $M_l$ FD DFT vector of a layer l. In addition,

[Math. 5]

$$\tilde{W}_l(2L \times M_l)$$

may be a matrix constituting a complex combination coefficient of the layer l. The subset based on FD DFT may be provided by $\{f_1, \ldots, f_{Ml}\}$. Here, "$f_i(1 \leq i \leq M_l)$" may represent an i-th DFT vector corresponding to an l-th layer.

The size (L) of SD DFT may be the same for all layers, or it may be L=2, 4. The size (M) of FD DFT may differ per layer, or it may be expressed by following Equation (5).

[Math. 6]

$$M = \left\lceil p \times \frac{N_3}{R} \right\rceil \quad ; p \in \left\{\frac{1}{4}, \frac{1}{2}\right\} \quad \text{(Equation 5)}$$
$$; R \in \{1, 2\}$$

The maximum number ($K_0$) (RI=1, 2) of NZCs per layer may be represented by following Equation (6).

[Math. 7]

$$K_0 = \lceil \beta \times 2LM \rceil \quad ; \beta \in \left\{\frac{1}{4}, \frac{1}{2}\right\} \quad \text{(Equation 6)}$$

The FD base total size (RI=3, 4) of all layers may be 2M. The total number of NZCs of all layers may be $2K_0$. Note that the size of FD DFT may be the same for all layers.

In NR, a base station may not be able to recognize the number of NZCs included in CSI Part 2. In view of this, a study is underway to include the total number of NZCs included in CSI Part 2, to CSI Part 1.

Specifically, reporting the total number $K_{NZ, TOT}$ of NZCs of RIs and all layers by using CSI Part 1 is under study. Here, $K_{NZ, TOT}$ may satisfy $1 \leq K_{NZ, TOT} \leq 2K_0$. In this case, the size of CSI Part 2 is assumed to depend on information included in CSI Part 1. In other words, information for determining the size of CSI Part 2 is transmitted by CSI Part 1.
<Huffman Code>

It is assumed that the method for reducing overhead for CSI Part 2 employs Huffman code. FIGS. 4A and 4B are diagrams to show an example of coding using Huffman code. As shown in FIG. 4A, each 4-bit value (bit group) is associated with a codeword (bit value of a certain number of bits). For example, in FIG. 4A, 4-bit values are associated with codewords of 2 to 7 bits. A bit group with a higher expectation value may be associated with a codeword of a smaller size.

FIG. 4B shows an example of coding and decoding of CSI Part 2 of 40 bits by using Huffman coding. As shown in FIG. 4B, in a case where an uncompressed 40-bit value (in other words, value of 10 bit groups) is given, a bitmap that is compressed to 26 bits may be generated based on the codeword set shown in FIG. 4A.

Based on the number of bits (26 bits) of the compressed bitmap included in CSI Part 1, a base station can restore the bitmap into the uncompressed 40-bit value. In this case, the size of the compressed bitmap may be included in CSI Part 1, as information for determining the size of CSI Part 2.

Note that, in a case where the number of NZCs is included in CSI Part 1, Huffman code may be used for a bitmap for NZCs included in CSI Part 2. In a case where NZCs are reported by CSI Part 2, to which DFT vectors the respective NZCs correspond may be notified by using a bitmap. In order to reduce the number of bits of the bitmap, Huffman code may be used.

Figures 5A, 5B:
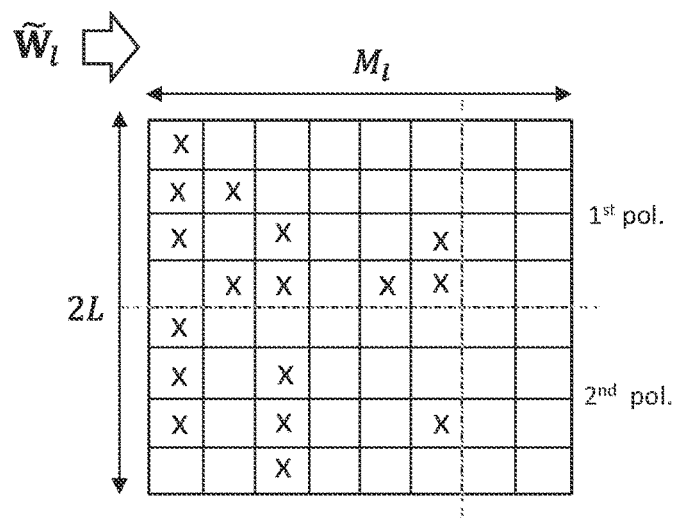
FIGS. 5A and 5B are diagrams to show an example of applying Huffman code on a bitmap for NZCs in CSI Part 2.

FIGS. 5A and 5B are diagrams to show an example of using Huffman code in a bitmap for NZCs in CSI Part 2. As shown in FIG. 5A, in reporting NZCs of a layer l, a bitmap that captures positions of the NZCs and quantized NZCs may be reported. For example, FIG. 5A shows a bitmap representing

[Math. 8]

$$\tilde{W}_l(2L \times M_l)$$

in Equation (4).

In a case of considering bitmaps of all layers, a joint bitmap may be generated. In a case of RI=v, the size of the joint bitmap may be expressed by following Equation (7). Note that, in Equation (7), the symbol "M" may represent the FD-base size per layer for RI=1, 2.

[Math. 9]

$$B_{Tot} = 2L \sum_{i=0}^{v-1} M_i = 2LvM \qquad \text{(Equation 7)}$$

A message that is coded by Huffman code may be generated in terms of a grouping set of bits. For example, the size of a bit group may be determined by following Equation (8).

[Math. 10]

$$\text{NUMBER OF BITS PER GROUP} = \left\lceil \frac{B_{Tot}}{2K_0} \right\rceil \qquad \text{(Equation 8)}$$

The probability of "1" in a joint bitmap may be expressed by, for example, following Equation 9. On the other hand, the probability of "0" may be represented by, for example, following Equation 10.

[Math. 11]

$$P\{y = 1\} = \frac{2K_0}{B_{Tot}} \qquad \text{(Equation 9)}$$

$$P\{y = 0\} = \frac{B_{Tot} - 2K_0}{B_{Tot}} \qquad \text{(Equation 10)}$$

Note that the above describes merely examples, and there is no limitation in considering a single-layer bitmap and employing the coding scheme described above. For example, in a case of using a 4-bit group, as shown in FIG. 5B, the bitmap may be compressed based on a coding scheme using Huffman code shown in FIG. 6.

In a case where CSI Part 2 includes the uncompressed bitmap (first bitmap) shown as an example in FIG. 5A the CSI Part 2 has an increased size. In consideration of this, the first bitmap may be Huffman-coded in terms of a bit group unit of a certain number, whereby a compressed bitmap (second bitmap) may be generated.

Figure 6:
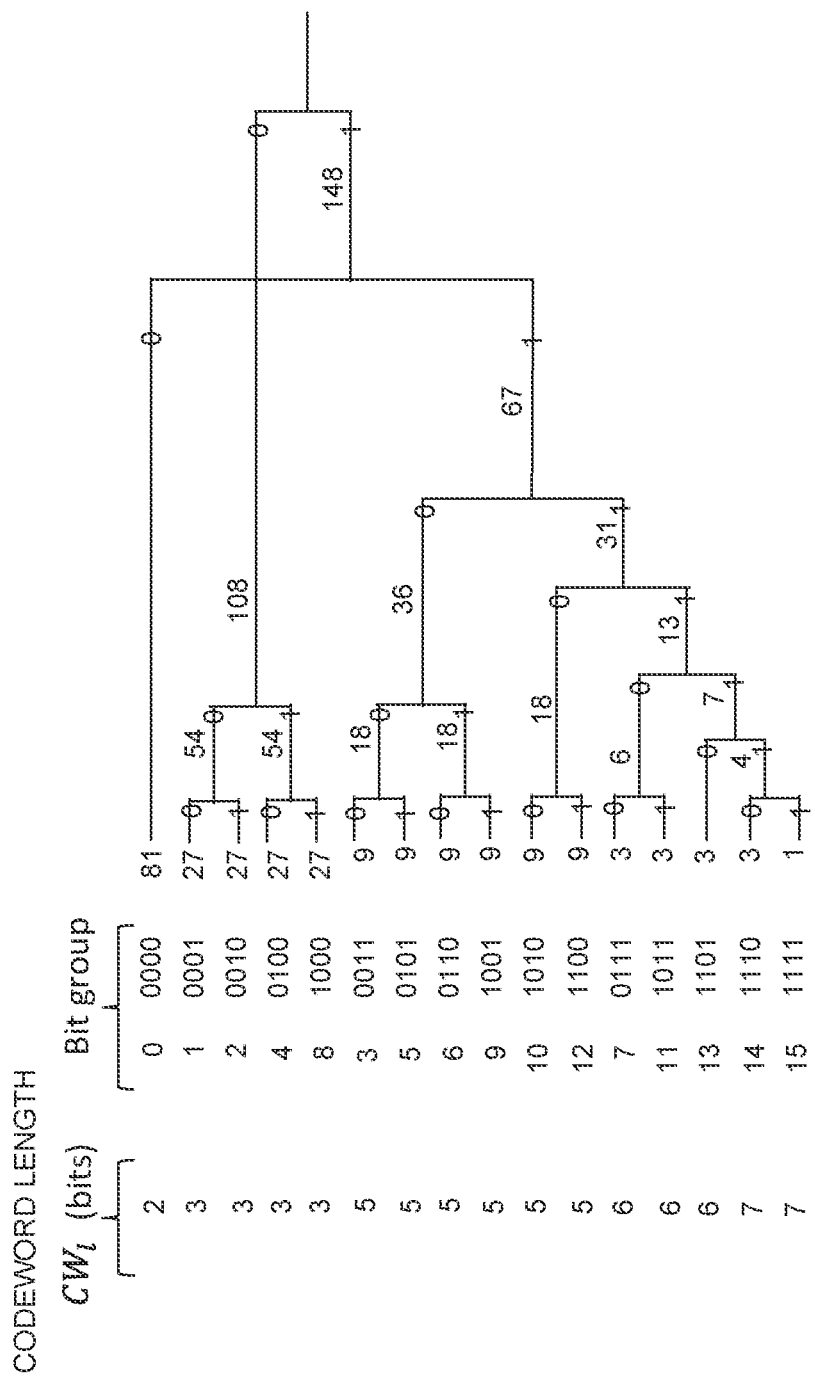
FIG. 6 is a diagram to show an example of a coding scheme using Huffman code.

Note that, as shown in FIG. 6, the codeword for a 4-bit group "1111" is 7 bits. For this reason, if the bit group "1111" and the like appear a lot of times in the bitmap shown as an example in FIG. 5B, the size of the second bitmap may be larger than the size of the first bitmap. On the other hand, the total of the numbers "1" in the first bitmap is limited to the number of NZCs that is reported by CSI Part 1, and a maximum number of the NZCs is limited to $2K_0$. This suggests that the bit group "1111" or the like is less likely to appear a lot of times.

Thus, CSI Part 2 that includes the second bitmap (such as in FIG. 5B), which is generated by Huffman-coding the first bitmap (such as in FIG. 5A), can have a reduced size. In this case, the size of the second bitmap may be included in CSI Part 1, as information for determining the size of CSI Part 2.

As described above, in NR, the size of CSI Part 2 is assumed to depend on the value of CSI Part 1. Specifically, in a case of using the FD compression, the size of CSI Part 2 depends on the number of NZCs in CSI Part 1. In a case of using the Huffman code, the size of CSI Part 2 depends on the size of the compressed bitmap in CSI Part 1.

Note that the compressed bitmap may be CSI Part 2 coded by Huffman-coding with respect to each group of a certain number of bits (such as in FIG. 4B) or may be a first bitmap for NZCs coded by Huffman-coding with respect to each group of a certain number of bits (such as in FIG. 5A).

In this manner, in the state where the size of CSI Part 2 depends on the value of information for determining the size of CSI Part 2 in CSI part 1, a base station is assumed to be unable to recognize the size of CSI Part 2 until decoding CSI Part 1.

In this situation, the base station is unable to identify a PUCCH resource that is determined based on the payload of UCI. This may cause the base station to not appropriately perform reception processing (such as reception, demodulation, or decoding) of UCI including CSI Part 1 and CSI Part 2.

In view of these circumstances, the inventors of the present invention came up with the idea of performing transmission control of UCI including UCI Part 2, based on the supposition that the size of CSI Part 2 or information for determining this size is supposed to be a certain value recognizable by both a UE and a base station, so that a base station appropriately performs reception processing (such as reception, demodulation, or decoding) of the UCI.

Here, the transmission control of the UCI may include at least one of, for example, determination of a PUCCH resource (Aspect 1), determination of at least one of dropping and omission of CSI (Aspect 2), and determination of a resource for CSI Part 2 transmitted on a PUSCH (Aspect 3).

The inventors of the present invention came up with the idea (Aspect 5) of controlling whether to suppose the size of CSI Part 2 or information for determining this size to be a certain value recognizable by both a UE and a base station, so as to appropriately perform reception processing (such as reception, demodulation, or decoding) of the UCI.

Embodiments according to the present disclosure will be described in detail with reference to the drawings, as follows.

Aspect 1

In Aspect 1, in a case of transmitting information (also referred to as "determination information and so on") for determining the size of CSI Part 2, in CSI Part 1, the UE may determine a PUCCH resource, based on the size of CSI Part 2 that is determined separately from the size of CSI Part 2 actually transmitted. The determination of the PUCCH resource may be performed by a base station or a UE.

Specifically, the size of CSI Part 2 to be used for determining the PUCCH resource may be assumed (determined or supposed) to be a certain number X of bits (Aspect 1. 1) or may be derived (determined) based on a parameter that is assumed to be a certain value Y (Aspect 1. 2). The assumption, derivation, or determination may be performed by a base station or a UE.

Figure 7:
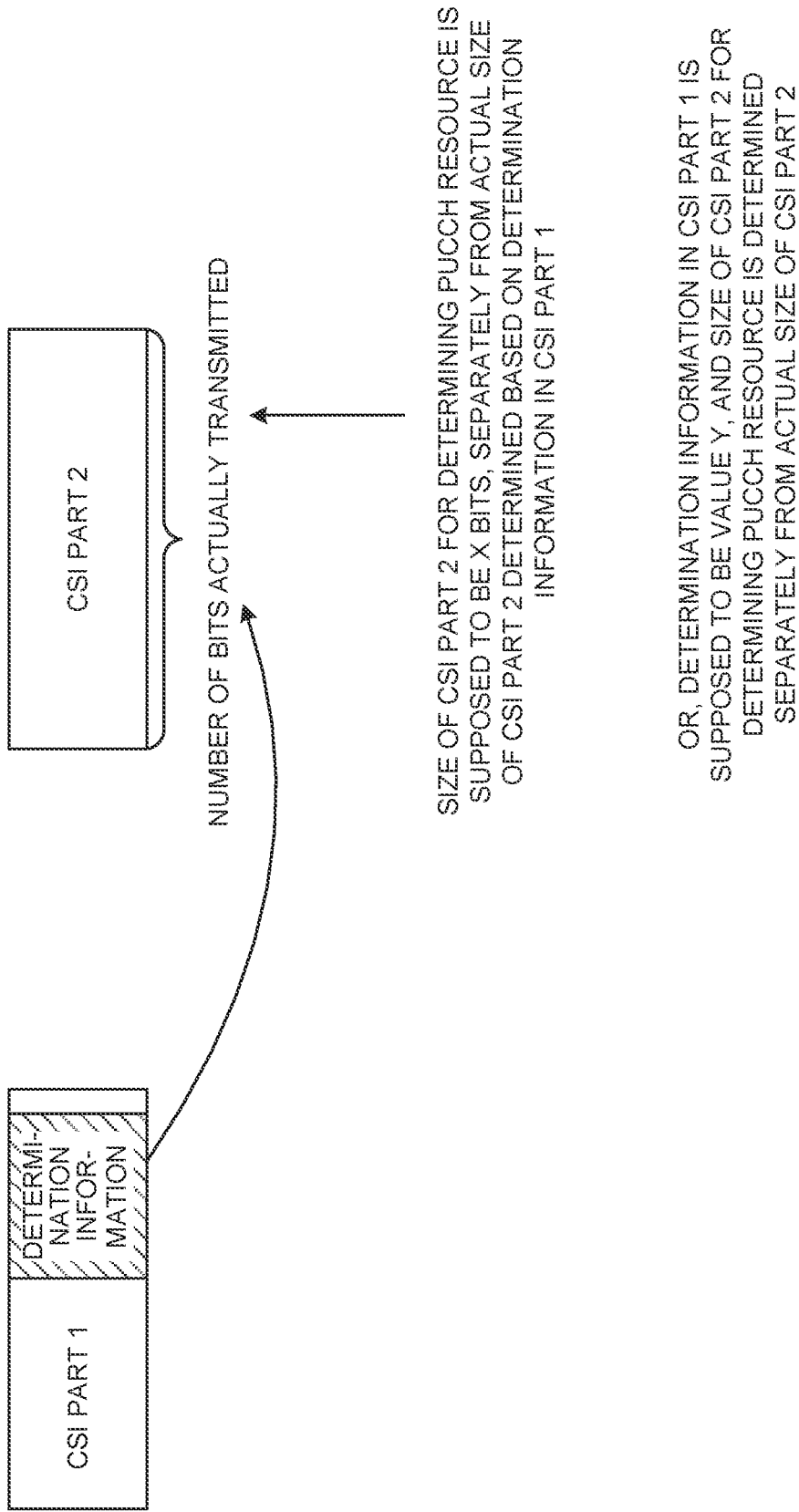
FIG. 7 is a diagram to show an example of CSI Part 1 and CSI Part 2 according to Aspect 1.

FIG. 7 is a diagram to show an example of determination of the size of CSI Part 2 according to Aspect 1. As shown in FIG. 7, CSI Part 1 may include information for determining the size of CSI Part 2. The determination information may be at least one of, for example, the number of NZCs included in CSI Part 2, and the number of bits of a bitmap compressed by using Huffman code, included in CSI Part 2. The bitmap may be a bitmap of a certain parameter in CSI Part 2 or a bitmap for NZCs.

As shown in FIG. 7, the size of CSI Part 2 that is actually transmitted may be determined based on the determination information obtained after CSI Part 1 is decoded. On the other hand, the size of CSI Part 2 for determining the PUCCH resource may be supposed to be X bits. Alternatively, supposing that the determination information is a value Y, the size of CSI Part 2 for determining the PUCCH resource may be determined based on the value Y.

(1. 1) Number X of Bits

The size of CSI Part 2 to be used for determining the PUCCH resource may be determined (assumed) to be a certain number X of bits. The number X of bits may be referred to as a "given number X of bits," a "specific number X of bits," and so on. The number X of bits may be, for example, any number in the following (1. 1. 1) to (1. 1. 4).

(1. 1. 1) The number X of bits may be, for example, a maximum size of CSI Part 2. The maximum size may be based on higher layer configuration.

(1. 1. 2) The number X of bits may be, for example, a minimum size of CSI Part 2. The minimum size may be based on higher layer configuration.

(1. 1. 3) The number X of bits may be configured by higher layer signaling. Information indicating the number of bits may be notified to the UE by higher layer signaling.

(1. 1. 4) The number X of bits may be a value defined by specifications.

(1. 2) Parameter Y

The size of CSI Part 2 to be used for determining the PUCCH resource may be determined (assumed) to be a value Y of one or more parameters. The value Y may be referred to as a "given value Y" and so on.

The parameter may include at least one of, for example, the number of non-zero coefficients (NZCs) (number of NZCs (NNZC)) included in CSI Part 1, the number of bits of a bitmap before or after being compressed by Huffman code, and the number of bits of a codeword used in Huffman code.

The value Y of the parameter may be, for example, any value in the following (1. 2. 1) to (1. 2. 4).

(1. 2. 1) The value Y may be a maximum value of the parameter. The maximum value may be based on higher layer configuration. For example, in a case where CSI Part 1 includes the number of NZCs in CSI Part 2, the value Y may be a maximum value (for example, $2K_0$) of the number of NZCs.

(1. 2. 2) The value Y may be a minimum value of the parameter. The minimum value may be based on higher layer configuration. For example, in the case where CSI Part 1 includes the number of NZCs in CSI Part 2, the minimum size of CSI Part 2 may be, for example, 1.

(1. 2. 3) The value Y may be configured to the UE by higher layer signaling. Information indicating the number of bits may be notified to the UE by higher layer signaling.

(1. 2. 4) The value Y may be a value defined by specifications. For example, in a case of the value Y being a value of the number of NZCs, the value Y may be Y=3 or 5. A certain number (for example, 1 or 2) in FD DFT vectors, or a certain number (for example, 1 or 2) in SD DFT vectors, may be defined as the value Y by specifications.

Note that, in a case where the parameter is the number of bits of a bitmap compressed by Huffman code, the value Y may be any of the followings.

Value based on the number of bits of an uncompressed bit group (for example, 4 bits in the case in FIG. 4A)

Value based on a minimum number of bits of compressed codewords (for example, 2 bits in the case in FIG. 4A)

Value based on a maximum number of bits of compressed codewords (for example, 7 bits in the case in FIG. 4A)

Value based on an average of compressed codewords (for example, 4.5 bits in the case in FIG. 4A)

Value of result of a certain calculation on a compressed codeword (for example, value of calculation using a weight coefficient)

Value based on expectation bits (for example, 3.27 bits in the case in FIG. 4A)

Note that digits after a decimal point may be rounded up or down. The rounding up or down may be performed per unit or per set of a certain number of units. For example, in a case of 3.27 bits, the value may be rounded up per bit group (unit) of 4 bits and may be assumed such that 4 bits×10 units=40 bits. Alternatively, the value may be rounded up per set of a certain number of units (for example, per 10 units), such that 3.27 bits×10 units=32.7≈33 bits.

The first aspect enables supposing the size of CSI Part 2 to be used for determining a PUCCH resource, to be a value recognizable by both a based station and a UE. As a result, even in a case where information for determining the size of CSI Part 2 is transmitted in CSI Part 1, the PUCCH resource can be appropriately determined by a base station or a UE.

Aspect 2

In Aspect 2, in a case of transmitting information for determining the size of CSI Part 2, in CSI Part 1, at least one of dropping and omission (dropping/omission) of CSI may be determined based on the size of CSI Part 2 actually transmitted or on the size of CSI Part 2 determined separately from the size of CSI Part 2 actually transmitted. The dropping/omission may be performed by a base station or a UE.

Aspect 2 differs from Aspect 1 in that dropping/omission of CSI can be performed based on the size of CSI Part 2 actually transmitted (refer to (2. 1. 4) and (2. 2. 4) described below). This is because Aspect 2 does not cause failure in decoding the whole UCI, as in a case where the PUCCH resource is unable to be determined in Aspect 1. Note that Aspects 1 and 2 may be used in combination.

Specifically, the size of CSI Part 2 to be used for controlling dropping/omission of the CSI may be assumed (determined) to be a certain number X of bits (2. 1) or may be derived (determined) based on a parameter that is assumed to be a certain value Y (2. 2). The assumption, derivation, or determination may be performed by a base station or a UE.

(2. 1) Number X of Bits

The size of CSI Part 2 to be used for controlling dropping/omission of the CSI may be determined (assumed) to be a certain number X of bits. The number X of bits may be referred to as a "given number X of bits," a "specific number X of bits," and so on. The number X of bits may be, for example, any number in the following (2. 1. 1) to (2. 1. 5).

(2. 1. 1) The number X of bits may be, for example, a maximum size of CSI Part 2. The maximum size may be based on higher layer configuration. The maximum size may be, for example, log 22×k0.

(2. 1. 2) The number X of bits may be, for example, a minimum size of CSI Part 2. The minimum size may be based on higher layer configuration. The minimum size may be, for example, log 22×k0, or may be 1.

(2. 1. 3) The number X of bits may be configured by higher layer signaling. Information indicating the number of bits may be notified to the UE by higher layer signaling.

(2. 1. 4) The number X of bits may be an actual number of bits of CSI Part 2 that is not recognized (unknown) until CSI Part 1 is decoded.

(2. 1. 5) The number X of bits may be a value defined by specifications.

(2. 2) Parameter Y

The size of CSI Part 2 to be used for controlling dropping/omission of the CSI may be determined (assumed) to be a value Y of one or more parameters. The value Y may be referred to as a "given value Y" and so on.

The parameter may be, for example, the NNZC included in CSI Part 2. The value Y of the parameter may be, for example, any value in the following (2. 2. 1) to (2. 2. 5).

(2. 2. 1) The value Y may be a maximum value of the parameter. The maximum value may be based on higher layer configuration.

(2. 2. 2) The value Y may be a minimum value of the parameter. The minimum value may be based on higher layer configuration.

(2. 2. 3) The value Y may be configured to the UE by higher layer signaling. Information indicating the number of bits may be notified to the UE by higher layer signaling.

(2. 2. 4) The number X of bits may be an actual number of bits of CSI Part 2 that is not recognized until CSI Part 1 is decoded.

(2. 2. 5) The value Y may be a value defined by specifications.

Aspect 2 enables appropriately controlling dropping/omission of CSI, even in a case where information for determining the size of CSI Part 2 is transmitted in CSI Part 1. The cases (2. 2. 1) to (2. 2. 3) and (2. 2. 5) do not require decoding of CSI Part 1 and thus enables rapid judgment of dropping/omission of CSI. The case (2. 2. 4) is based on an actual size of CSI Part 2 and thus improves judgment accuracy of dropping/omission of CSI.

Aspect 3

In Aspect 3, in a case of transmitting information for determining the size of CSI Part 2, in CSI Part 1, a resource for CSI Part 2 that is transmitted on a PUSCH may be determined based on the size of CSI Part 2 actually transmitted or on the size of CSI Part 2 determined separately from the size of CSI Part 2 actually transmitted. The determination of the resource may be performed by a base station or a UE.

Aspect 3 differs from Aspect 1 in that dropping/control of CSI can be performed based on the size of CSI Part 2 actually transmitted (refer to (3. 1. 4) and (3. 2. 4) described below). This is because Aspect 3 does not cause failure in decoding the whole UCI, as in a case where the PUCCH resource is unable to be determined in Aspect 1. Note that Aspects 1 and 3 or Aspects 1 to 3 may be used in combination.

Specifically, the size of CSI Part 2 to be used for determining the PUSCH resource may be assumed (determined) to be the certain number X of bits (3. 1) or may be derived (determined) based on a parameter that is assumed to be a certain value Y (3. 2). The assumption, derivation, or determination may be performed by a base station or a UE.

(3. 1) Number X of Bits

The size of CSI Part 2 to be used for determining the PUSCH resource may be determined (assumed) to be the certain number X of bits. The number X of bits may be referred to as a "given number X of bits," a "specific number X of bits," and so on. The number X of bits may be, for example, any number in the following (3. 1. 1) to (3. 1. 5).

(3. 1. 1) The number X of bits may be, for example, a maximum size of CSI Part 2. The maximum size may be based on higher layer configuration. The maximum size may be, for example, log 22×k0.

(3. 1. 2) The number X of bits may be, for example, a minimum size of CSI Part 2. The minimum size may be based on higher layer configuration. The minimum size may be, for example, log 22×k0, or may be 1.

(3. 1. 3) The number X of bits may be configured by higher layer signaling. Information indicating the number of bits may be notified to the UE by higher layer signaling.

(3. 1. 4) The number X of bits may be an actual number of bits of CSI Part 2 that is not recognized (unknown) until CSI Part 1 is decoded.

(3. 1. 5) The number X of bits may be a value defined by specifications.

(3. 2) Parameter Y

The size of CSI Part 2 to be used for controlling dropping/omission of the CSI may be determined (assumed) to be a value Y of one or more parameters. The value Y may be referred to as a "given value Y" and so on.

The parameter may be, for example, the NNZC included in CSI Part 2. The value Y of the parameter may be, for example, any value in the following (3. 2. 1) to (3. 2. 5).

(3. 2. 1) The value Y may be a maximum value of the parameter. The maximum value may be based on higher layer configuration.

(3. 2. 2) The value Y may be a minimum value of the parameter. The minimum value may be based on higher layer configuration.

(3. 2. 3) The value Y may be configured to the UE by higher layer signaling. Information indicating the number of bits may be notified to the UE by higher layer signaling.

(3. 2. 4) The number X of bits may be an actual number of bits of CSI Part 2 that is not recognized until CSI Part 1 is decoded.

(3. 2. 5) The value Y may be a value defined by specifications.

Aspect 3 enables appropriately controlling the PUSCH resource, even in a case where information for determining the size of CSI Part 2 is transmitted in CSI Part 1. The cases (3. 2. 1) to (3. 2. 3) and (3. 2. 5) do not require decoding of CSI Part 1 and thus enables rapid judgment of the PUSCH resource. The case (3. 2. 4) is based on an actual size of CSI Part 2 and thus improves judgment accuracy of the PUSCH resource.

Aspect 4

In Aspect 4, the condition that "information for determining the size of CSI Part 2 is transmitted by CSI Part 1" will be described. The condition may be (may be rephrased as) one of the following situations (4. 1) to (4. 4) or may be equal to (may be rephrased as) a combination of at least two of the situations (4. 1) to (4. 4).

(4. 1) The size (for example, the number X of bits) of CSI Part 2 is reported by CSI Part 1.

(4. 2) Information (for example, a value Y) for determining the size of CSI Part 2 is reported by CSI Part 1.

(4. 3) An NNZC (total number of non-zero coefficients (NZCs) is reported by CSI Part 1 (or a zero coefficient is transmitted). In this case, CSI Part 1 may include the number of NZCs in CSI Part, as determination information.

(4. 4) At least one CSI Part 2 compressed due to a compressed bitmap. In this case, CSI Part 1 may include information indicating the size of the compressed bitmap of CSI Part 2. The compressed bitmap may be a bitmap for NZCs.

Aspect 5

In Aspect 5, the phenomenon that the size of CSI Part 2 is unable to be recognized until CSI Part 1 is decoded causes a problem mainly in determination of a PUCCH resource (such as a PRB size). This is because a base station is unable to recognize the size of CSI Part 2 until decoding CSI Part 1, resulting in being unable to determine a PUCCH resource.

On the other hand, reporting CSI on a PUSCH does not cause a big problem compared with the case of reporting CSI on a PUCCH and has only the following two issues.

Issue 1: A base station is unable to start decoding CSI Part 2 until decoding CSI Part 1.

Issue 2: A UL-SCH as a transport channel is subjected to rate matching based on the size of CSI Part 2 (in a case where the size of CSI is more than 2 bits), and therefore, a base station is unable to start decoding the UL-SCH (UL data) until decoding CSI Part 1. Note that the issue 2 does not occur in a case where the UL-SCH is not multiplexed with the CSI.

(5. 1)

The UE may determine the size of CSI Part 2 actually transmitted, based on a UL channel that is used in transmission of UCI (for example, UCI including CSI).

Specifically, in a case of transmitting UCI (for example, UCI including CSI) on a PUSCH, the actual size of CSI Part 2 for transmitting the UCI may depend on information (for example, information indicating the size of CSI Part 2) included in CSI Part 1.

Note that at least one of the following cases may be assumed for a case that CSI is transmitted on a PUSCH.

CSI is triggered by a PUCCH but is piggy-backed on a PUSCH.

CSI is transmitted on a PUSCH (for example, an aperiodic CSI report transmitted on a PUSCH).

On the other hand, in a case of transmitting the UCI on a PUCCH, the actual size of CSI Part 2 for transmitting the UCI may not necessarily depend on information (for example, information indicating the size of CSI Part 2) included in CSI Part 1. The size of the CSI Part 2 may be the number X of bits described in (1. 1. 1) to (1. 1. 4) in Aspect 1 or may be derived from the value Y of the parameter described in (1. 2. 1) to (1. 2. 4).

In other words, the UE may determine the size of CSI Part 2 to be a fixed value. The fixed value may be indicated by at least one of higher layer signaling and DCI or derived from at least one of higher layer signaling and DCI.

(5. 2)

The UE may determine the size of CSI Part 2 actually transmitted, based on whether to transmit UCI (for example, UCI including CSI) in addition to an uplink shared channel (UL-SCH) as a transport channel, on a PUSCH. Note that the UL-SCH may include at least one of UL data, user data, and higher layer control information.

Whether to transmit CSI in addition to an UL-SCH may be determined based on a value of a certain field (such as a UL-SCH indicator field) in DCI (such as DCI format 0_1) that triggers the CSI reporting. Note that the CSI may be A-CSI or SP-CSI that is transmitted on a PUSCH.

Specifically, in a case of transmitting the UCI on a PUSCH without the UL-SCH, the actual size of CSI Part 2 for transmitting the UCI may depend on information (for example, information indicating the size of CSI Part 2) included in CSI Part 1.

On the other hand, in a case of transmitting the UCI on a PUSCH in addition to the UL-SCH, the actual size of CSI Part 2 for transmitting the UCI may not necessarily depend on information (for example, information indicating the size of CSI Part 2) included in CSI Part 1. The size of the CSI Part 2 may be the number X of bits described in (1. 1. 1) to (1. 1. 4) in Aspect 1 or may be derived from the value Y of the parameter described in (1. 2. 1) to (1. 2. 4).

In other words, the UE may determine the size of CSI Part 2 to be a fixed value. The fixed value may be indicated by at least one of higher layer signaling and DCI or derived from at least one of higher layer signaling and DCI.

Alternatively, control opposite to the above-described control may be performed. Specifically, the actual size of CSI Part 2 for transmitting the UCI may not depend on information (for example, information indicating the size of CSI Part 2) included in CSI Part 1, in a case of transmitting the UCI on a PUSCH without the UL-SCH, whereas it may depend on information included in CSI Part 1, in a case of transmitting the UCI on a PUSCH in addition to the UL-SCH.

Note that the above-described control may be assumed to be used in determination of a PUCCH resource, but may also be used in dropping/omission of CSI and in determination of a resource of CSI Part 2 for the PUSCH. In other words, Aspect 5 can be combined with at least one of Aspects 1 to 3.

In Aspect 5, reception processing (such as reception, demodulation, or decoding) of the UCI can be appropriately performed by controlling whether the size of CSI Part 2 or information for determining this size is supposed to be a certain value that can be recognized by both a UE and a base station.

Aspect 6

Note that although supposition of information for determining the size of CSI Part 2 is described in the present disclosure, the present disclosure is not limited thereto. The supposition can be applied for determination information of any parameters (such as an RI) relating to CSI Part 2, in addition to the size of CSI Part 2.

(Radio Communication System)

Hereinafter, a structure of a radio communication system according to one embodiment of the present disclosure will be described. In this radio communication system, the radio communication methods according to the foregoing embodiments of the present disclosure may be used alone or may be used in combination for communication.

Figure 8:
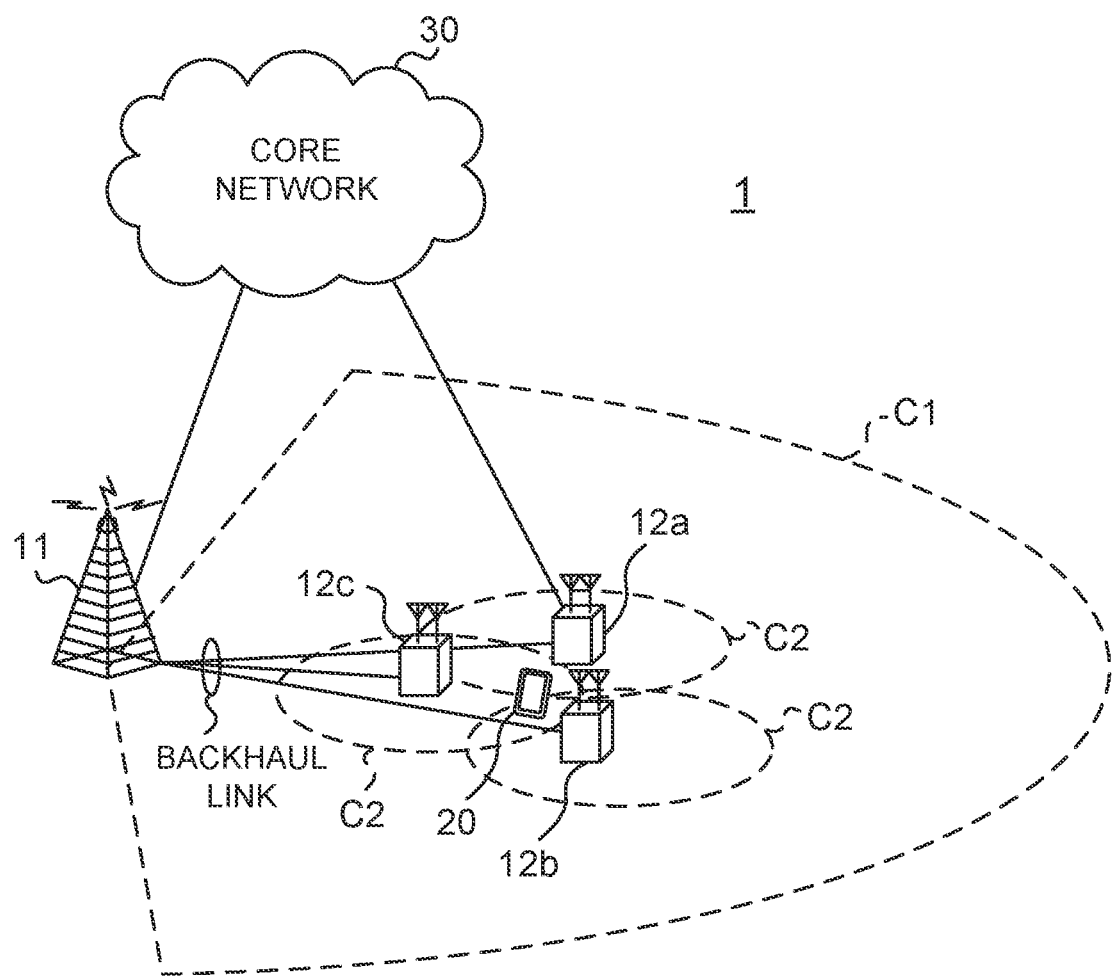
FIG. 8 is a diagram to show an example of a schematic structure of a radio communication system according to one embodiment.

FIG. 8 is a diagram to show an example of a schematic structure of the radio communication system according to one embodiment. A radio communication system 1 may be a system implementing a communication using long term evolution (LTE), 5th generation mobile communication system new radio (5G NR), or the like, the specifications of which have been drafted by third generation partnership project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface, and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information is communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 9:
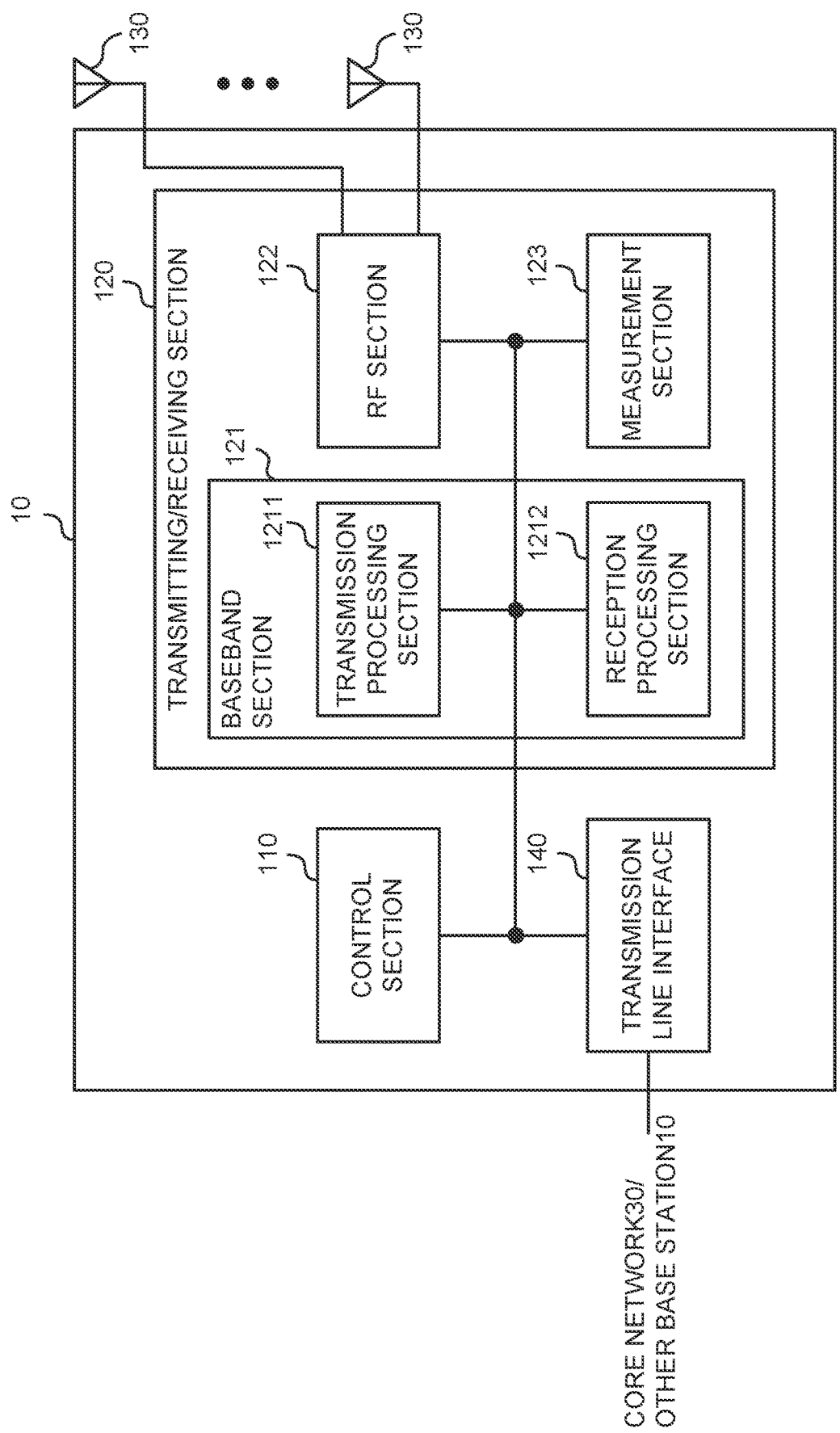
FIG. 9 is a diagram to show an example of a structure of a base station according to one embodiment.

FIG. 9 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam foaming (for example, precoding), analog beam foaming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may receive channel state information that contains a first part including information for determining the size of a second part and that contains the second part.

The control section 110 may control reception processing (such as reception, demodulation, and decoding) of the channel state information. Specifically, the control section 110 may determine the size of the second part based on the determination information in the first part and may determine a physical uplink control channel resource to be used in transmission of the channel state information, based on the determined size. The control section 110 may recognize at least one of dropping and omission of the channel state information, based on the determined size. The control section 110 may also determine a physical uplink shared channel resource to be used in transmission of the channel state information, based on the determined size.

The control section 110 may suppose the size of the second part or the determination information to be a certain value to determine the physical uplink control channel resource to be used in transmission of the channel state information, based on the certain value (Aspect 1). The control section 110 may recognize at least one of dropping and omission of the channel state information, based on the certain value (Aspect 2). The control section 110 may also determine the physical uplink shared channel resource to be used in transmission of the channel state information, based on the certain value (Aspect 3).

The control section 110 may control determination of the size of the second part, based on the physical uplink channel on which the channel state information is transmitted (Aspect 5, (5. 1)). Specifically, in a case where the channel state information is transmitted on a physical uplink shared channel, the control section 110 may determine the size of the second part, based on the determination information in the first part. In contrast, in a case where the channel state information is transmitted on a physical uplink control channel, the control section 110 may determine the size of the second part without depending on the determination information in the first part.

The control section 110 may control determination of the size of the second part, based on whether to transmit the channel state information on a physical uplink shared channel, in addition to an uplink shared channel as a transport channel (Aspect 5, (5. 2)).

Specifically, the control section 110 may determine the size of the second part, based on the determination information in the first part, in a case where the channel state information is transmitted on the physical uplink shared channel without the uplink shared channel (or the channel state information is transmitted on the physical uplink shared channel, in addition to the uplink shared channel). The control section 110 may determine the size of the second part without depending on the determination information in the first part, in a case where the channel state information is transmitted on the physical uplink shared channel, in addition to the uplink shared channel (or the channel state information is transmitted on the physical uplink shared channel, without the uplink shared channel).

(User Terminal)

Figure 10:
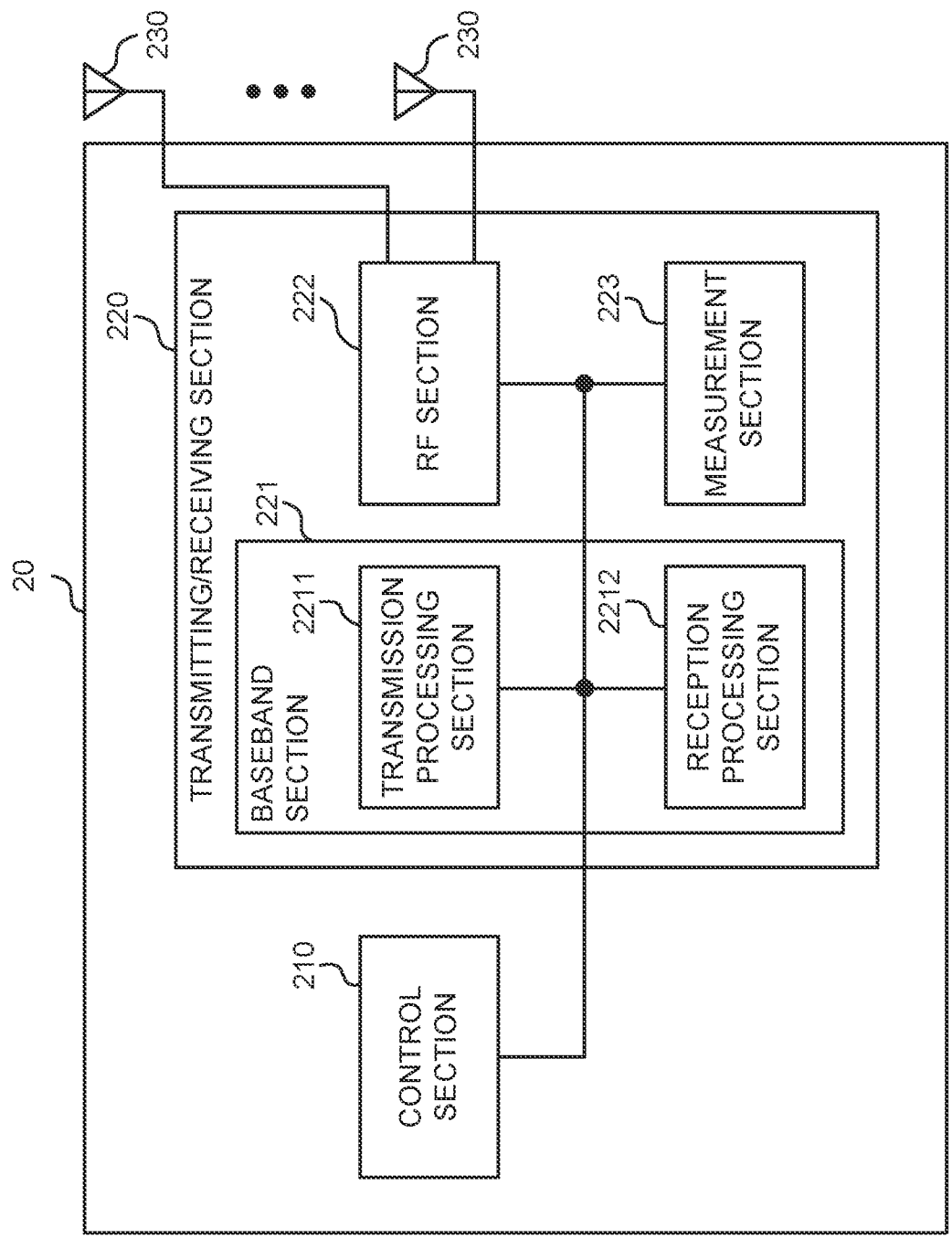
FIG. 10 is a diagram to show an example of a structure of a user terminal according to one embodiment.

FIG. 10 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211 and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam foaming (for example, precoding), analog beam foaming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the communication path interface 240.

Note that the transmitting/receiving section 220 may transmit channel state information that contains a first part including information for determining the size of a second part and that contains the second part.

The control section 210 may suppose the size of the second part or the determination information to be a certain value and may then determine a physical uplink control channel resource to be used in transmission of the channel state information, based on the certain value (Aspect 1).

The control section 210 may control at least one of dropping and omission of the channel state information, based on the certain value (Aspect 2).

The control section 210 may determine a physical uplink shared channel resource to be used in transmission of the channel state information, based on the certain value (Aspect 3).

The certain value may be configured to be a maximum or minimum number of bits of the second part or configured by a higher layer, or may be determined by specifications in advance.

The determination information may be at least one of the number of non-zero coefficients and the number of bits compressed by Huffman code.

The control section 210 may control determination of the size of the second part, based on the physical uplink channel on which the channel state information is transmitted (Aspect 5, (5. 1)).

The control section 210 may determine the size of the second part, based on the determination information in the first part, in a case of transmitting the channel state information on a physical uplink shared channel.

The control section 210 may determine the size of the second part without depending on the determination information in the first part, in a case of transmitting the channel state information on a physical uplink control channel.

The control section 210 may control determination of the size of the second part based on whether to transmit the channel state information on a physical uplink shared channel, in addition to an uplink shared channel as a transport channel (Aspect 5, (5. 2)).

The control section 210 may determine the size of the second part, based on the determination information in the first part, in a case of transmitting the channel state information on the physical uplink shared channel without the uplink shared channel (or transmitting the channel state information on the physical uplink shared channel, in addition to the uplink shared channel).

The control section 210 may determine the size of the second part without depending on the determination information in the first part, in a case where the channel state information is transmitted on the physical uplink shared channel, in addition to the uplink shared channel (or the channel state information is transmitted on the physical uplink shared channel, without the uplink shared channel).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 11:
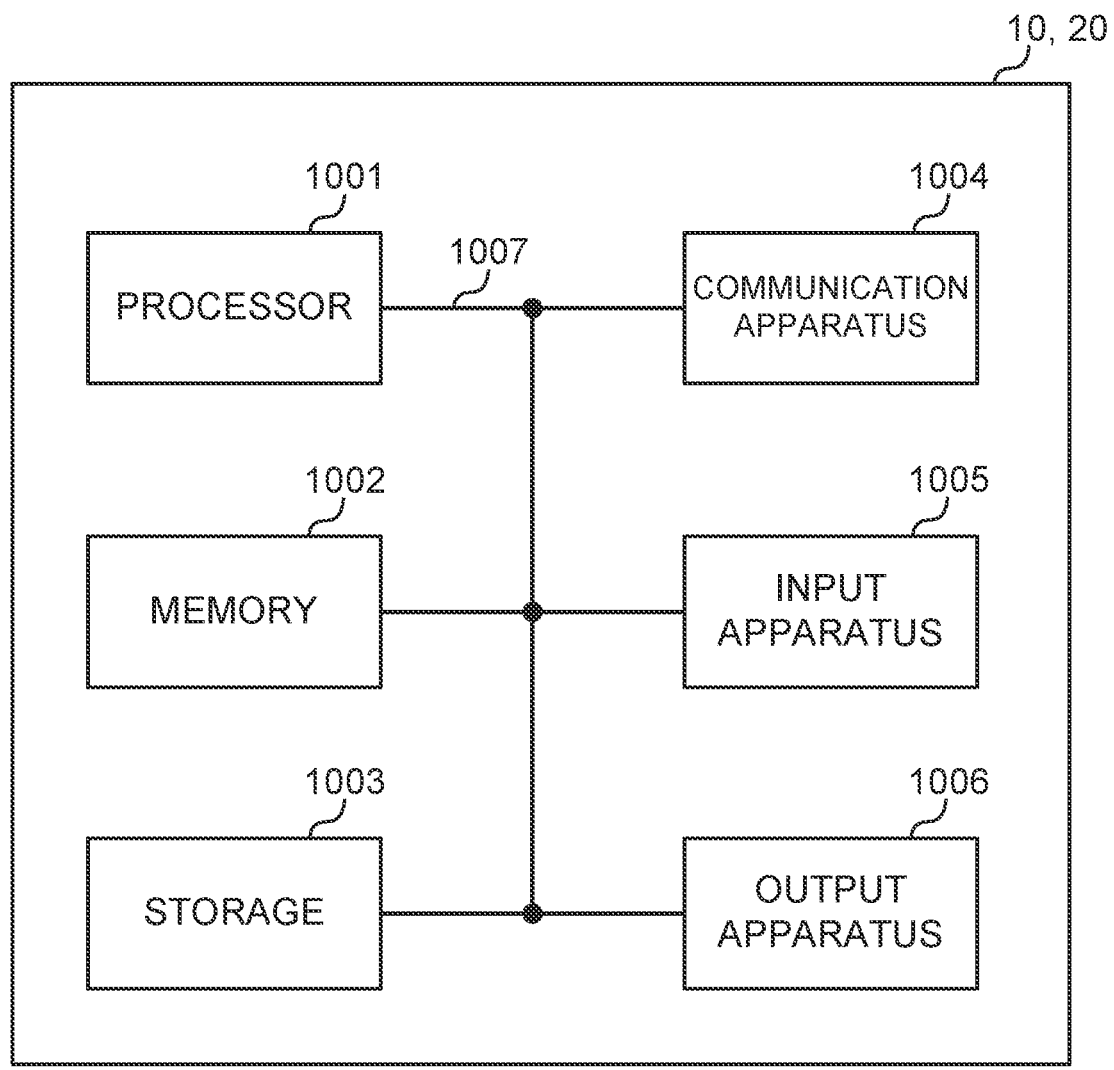
FIG. 11 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 11 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120a (220a) and the receiving section 120b (220b) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in a case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBS), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a transmitter that transmits channel state information (CSI) Part 1 including a total number of non-zero coefficients (NZCs) of all layers, the total number being equal to or less than a maximum value configured based on higher layer signaling; and
   a processor that controls determination of a size of CSI Part 2 based on the maximum value,
   wherein a total number of numbers "1" in a bitmap included in the CSI Part 2 is limited to the maximum value, and
   wherein the processor controls a determination of omission of the CSI Part 2 based on the total number of NZCs.

2. A radio communication method for a terminal, comprising:
   transmitting channel state information (CSI) Part 1 including a total number of non-zero coefficients (NZCs) of all layers, the total number being equal to or less than a maximum value configured based on higher layer signaling;
   controlling determination of a size of CSI Part 2 based on the maximum value; and
   controlling a determination of omission of the CSI Part 2 based on the total number of NZCs,
   wherein a total number of numbers "1" in a bitmap included in the CSI Part 2 is limited to the maximum value.

3. A system comprising a terminal and a base station, wherein
   the terminal comprises:
      a transmitter of the terminal that transmits channel state information (CSI) Part 1 including a total number of non-zero coefficients (NZCs) of all layers, the total number being equal to or less than a maximum value configured based on higher layer signaling; and
      a processor that controls determination of a size of CSI Part 2 based on the maximum value, and
   the base station comprises:
      a transmitter of the base station that transmits the higher layer signaling,
   wherein a total number of numbers "1" in a bitmap included in the CSI Part 2 is limited to the maximum value, and
   wherein the processor controls a determination of omission of the CSI Part 2 based on the total number of NZCs.

* * * * *